United States Patent [19]

Sakai et al.

[11] Patent Number: 6,075,927
[45] Date of Patent: Jun. 13, 2000

[54] IMAGE COMMUNICATION APPARATUS AND METHOD SELECTIVELY RECORDING A COLOR OR MONOCHROME PATTERN IMAGE IN RESPONSE TO RECEIVED IMAGE INFORMATION

[75] Inventors: Masanori Sakai, Yokohama; Kunio Yoshihara, Sagamihara; Yoshinobu Aiba, Yokohama; Hiroshi Ohmura, Inagi; Hideto Kohtani, Yokohama; Hirohiko Itoh, Kawasaki; Takehito Utsunomiya, Yokohama, all of Japan

[73] Assignee: Canon Kabushiki Kaisha, Tokyo, Japan

[21] Appl. No.: 08/377,259

[22] Filed: Jan. 24, 1995

Related U.S. Application Data

[62] Division of application No. 07/907,207, Jul. 1, 1992.

[30] Foreign Application Priority Data

Jul. 5, 1991 [JP] Japan ..................................... 3-191026
Oct. 23, 1991 [JP] Japan ..................................... 3-304161

[51] Int. Cl.⁷ ............................ G06K 15/00; H04N 1/23; H04N 1/32; H04N 1/50
[52] U.S. Cl. .......................... 395/109; 358/501; 358/530; 358/401; 358/438; 358/468; 395/114
[58] Field of Search .................................. 358/501, 504, 358/515, 530, 434, 435, 438, 439, 468, 448, 500; 382/162, 165; 395/109, 114; 345/149

[56] References Cited

U.S. PATENT DOCUMENTS

| | | | |
|---|---|---|---|
| 4,369,461 | 1/1983 | Tamura | 358/501 |
| 4,688,031 | 8/1987 | Haggerty | 345/149 |
| 4,739,397 | 4/1988 | Hayashi | 358/501 |
| 5,027,221 | 6/1991 | Hisatake et al. | 358/500 |
| 5,032,904 | 7/1991 | Murai et al. | 358/500 |
| 5,153,576 | 10/1992 | Harrington | 345/149 |
| 5,168,352 | 12/1992 | Naka et al. | |

FOREIGN PATENT DOCUMENTS

| | | |
|---|---|---|
| 0059120 | 9/1982 | European Pat. Off. . |
| 3339966 | 5/1984 | Germany . |
| 3802736 | 8/1988 | Germany . |
| 4034540 | 5/1991 | Germany . |
| 59-99581 | 6/1984 | Japan . |
| 278469 | 11/1988 | Japan ............................ H04N 1/46 |
| 63-278469 | 11/1988 | Japan . |
| 3-14077 | 1/1991 | Japan . |
| 3191482 | 8/1991 | Japan . |

OTHER PUBLICATIONS

U.S. Statutory Invention Registration H524, Weideman, Sep. 6, 1988.

Primary Examiner—Scott Rogers
Attorney, Agent, or Firm—Fitzpatrick, Cella, Harper & Scinto

[57] ABSTRACT

There is disclosed an image communication apparatus comprising communication means for communicating the image information, recognition means for recognizing a predetermined image within the image information received via the communication means, and recording means for recording received image information on a recording medium with a plurality of colors, wherein the recording means makes the recording with a color in accordance with a recognition result of the recognition means.

11 Claims, 14 Drawing Sheets

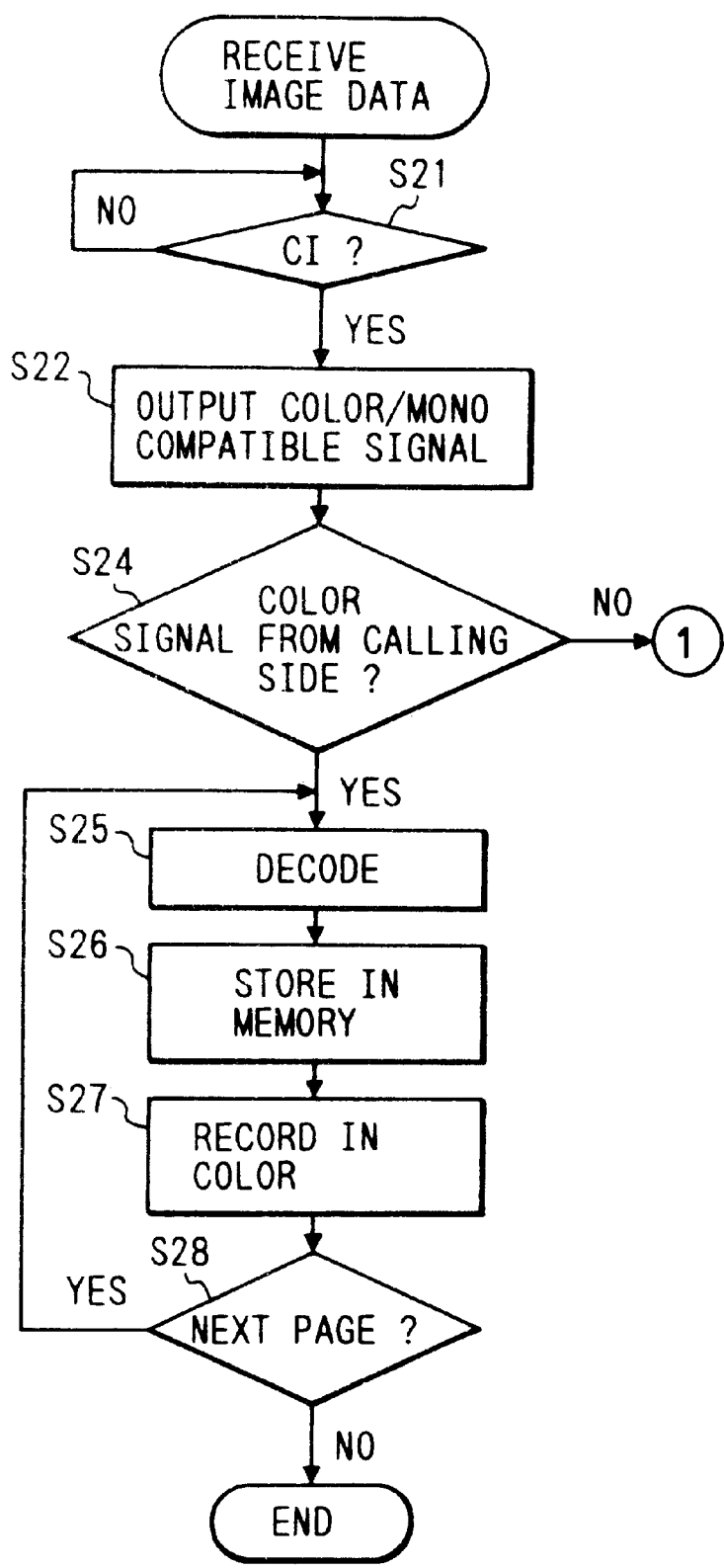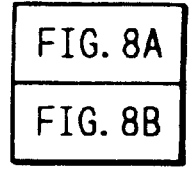
FIG. 8A
FIG. 8

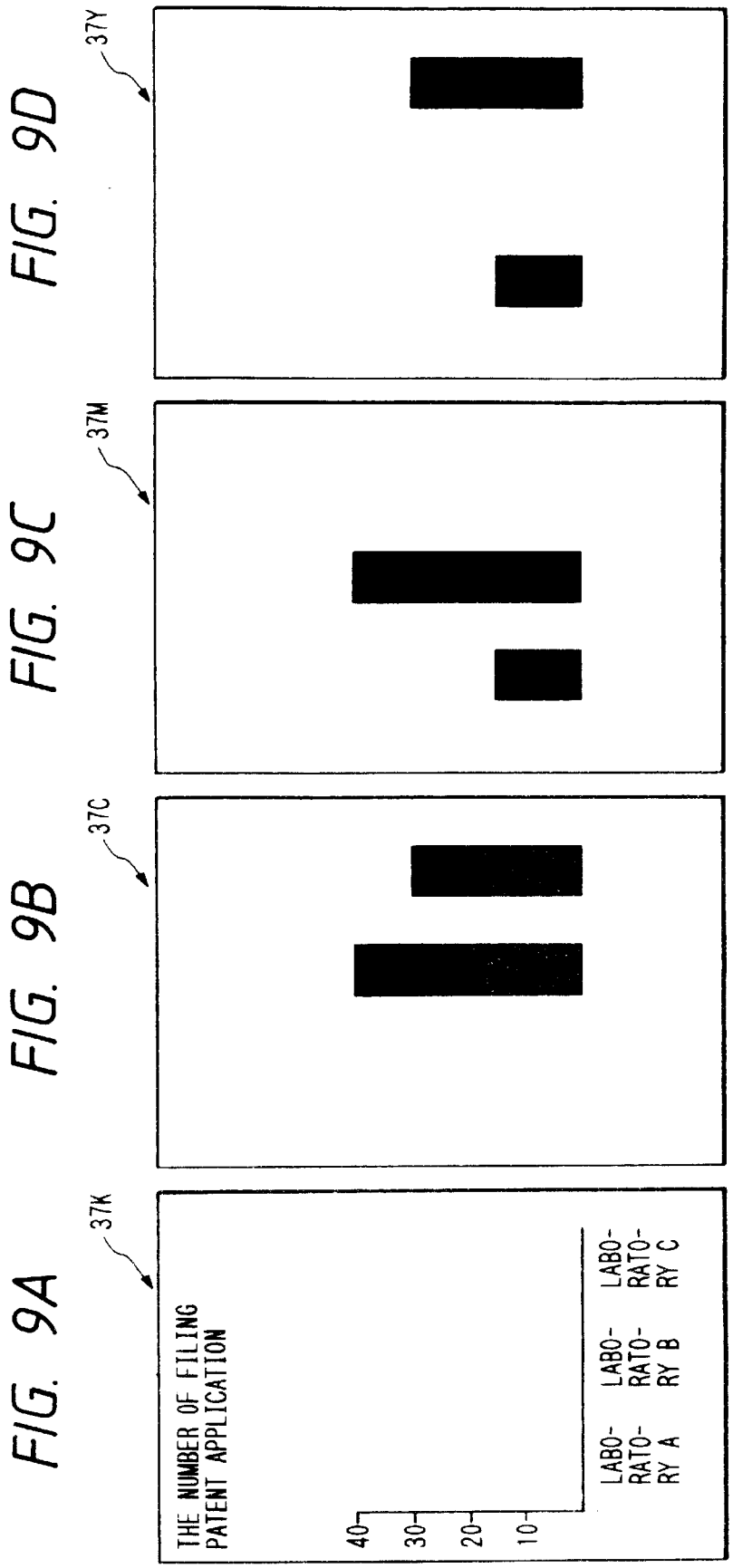

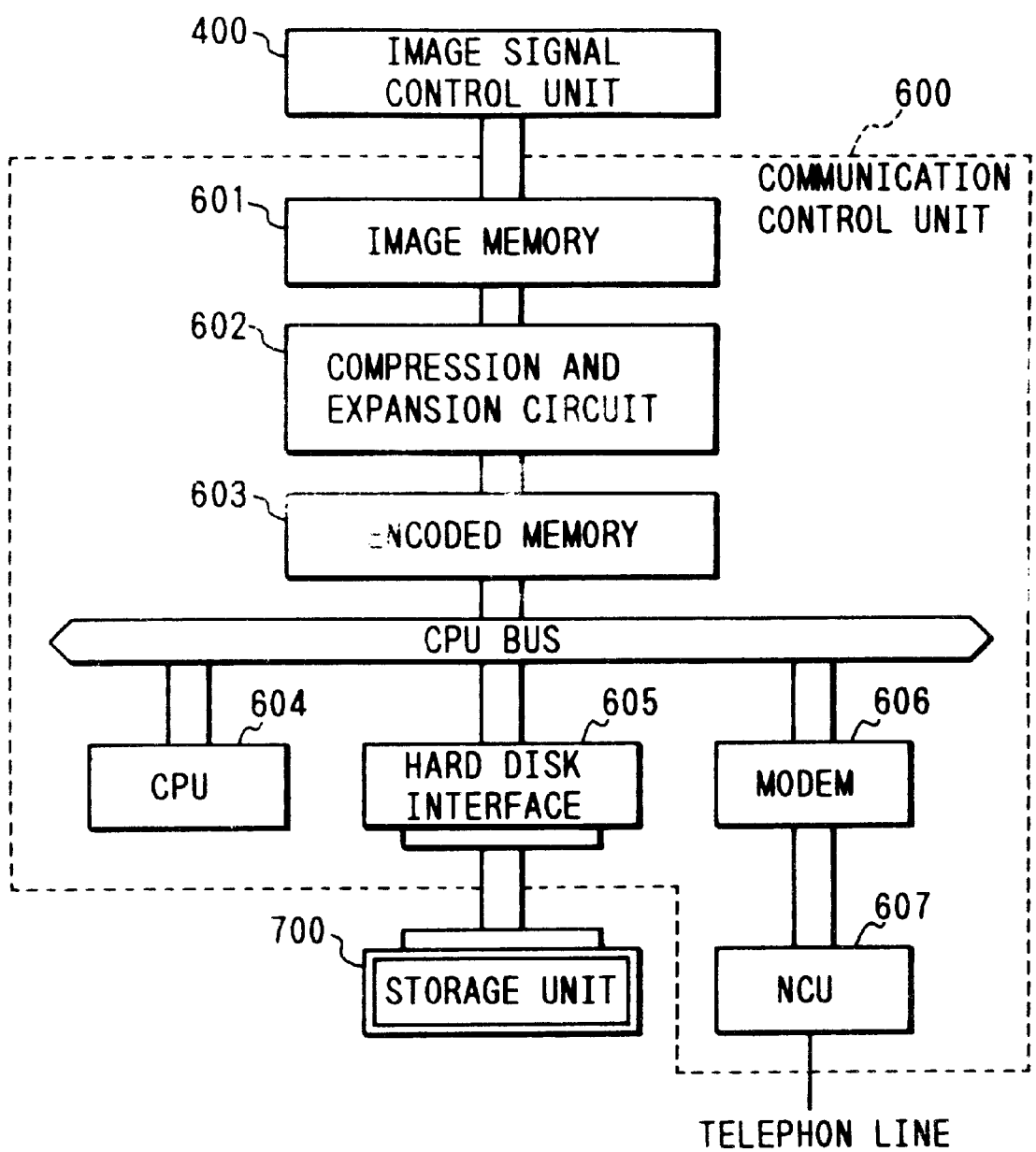

IMAGE COMMUNICATION APPARATUS AND METHOD SELECTIVELY RECORDING A COLOR OR MONOCHROME PATTERN IMAGE IN RESPONSE TO RECEIVED IMAGE INFORMATION

This application is a division of application Ser. No. 07/907,207 filed Jul. 1, 1992.

BACKGROUND OF THE INVENTION

1. Field of the Invention

The present invention relates to an image communication apparatus for transmission and reception of the image information.

2. Related Background Art

Recently, color facsimile apparatuses have been put into practical use in which a color original is read and a color image is transmitted. Also, recently, composite apparatuses have started to be widely used in which the facsimile feature is provided on copying apparatuses.

However, there was a problem with a color facsimile apparatus that it was necessary to buy an expensive color dedicated facsimile apparatus to enable the transmission and reception of a color image, irrespective of a relatively low frequency of transmitting or receiving the color image, and that such color dedicated facsimile apparatuses had to be prepared on both the transmission and reception sides to allow the color image transmission.

Also, there is a drawback with the color image data that the transmission time is longer owing to a large amount of information.

A composite apparatus has insufficient capability of the high-level image processing in which a copying unit portion only involves the simple image processing in most cases so that a facsimile portion transmits a processed image. Here, there is a problem that if a high-level image processing is applied by the copying unit portion, the amount of image data increases, so that it takes a longer communication time to transfer this image data via the facsimile portion.

SUMMARY OF THE INVENTION

An object of the present invention is to provide an image processing apparatus which has overcome the above-mentioned problems.

It is another object of the present invention to provide an improved image processing apparatus.

Also, it is another object of the present invention to provide an image processing apparatus capable of shortening the communication time of image data.

It is a further object of the present invention to provide an image processing apparatus capable of transmitting the image information with less amount of information and without losing the information.

It is another object of the present invention to provide an image processing apparatus capable of patterning a color image for transmission.

It is another object of the present invention to provide an image processing apparatus capable of coloring a transmitted patterned image for output.

It is another object of the present invention to provide an image processing apparatus which allows an image processing specified on the transmission side to be made on the reception side.

Other objects and features of the present invention will be more apparent from the following description and the drawings.

BRIEF DESCRIPTION OF THE DRAWINGS

FIGS. 9A–9D are views exemplifying data stored in the K memory portion and the color information memory portion at the reception.

FIG. 13 is a block diagram illustrating a detailed configuration of a communication control unit in FIG. 10.

DESCRIPTION OF THE PREFERRED EMBODIMENTS

The preferred embodiments of the present invention will be described in detail with reference to the drawings.

Figure 1:
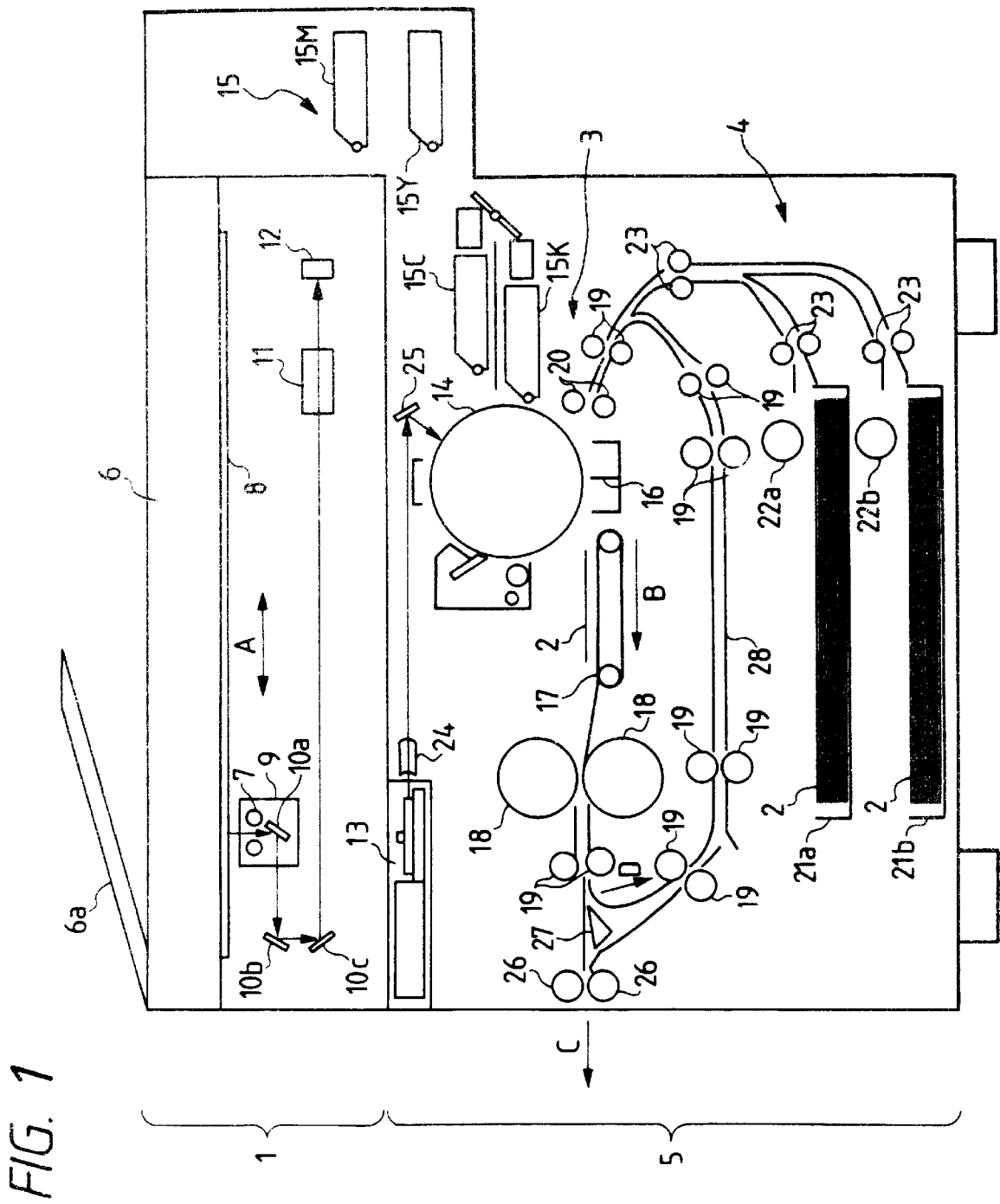
FIG. 1 is an internal structural view of an image processing apparatus according to the first embodiment of the present invention.

FIG. 1 is an internal structural view of an image processing apparatus according the first embodiment of the present invention, in which an image communication apparatus is composed of an image read unit 1 for reading an image drawn on an original, an imaging system 3 for forming the image on a recording sheet 2 based on the image formation read by the image read unit 1, and a sheet feed/conveyance unit 4 for feeding the recording sheet 2 to the imaging system 3.

The image read unit 1 is composed of an original conveying apparatus for feeding successively originals stacked on an original stacker 6a to an original base glass 8, a scanner unit 9 for scanning an original laid on the original base glass 8 illuminated by a lamp 7 while moving in the direction of arrow A, a plurality of reflecting mirrors 10a, 10b, 10c and a condenser lens 11 for directing the reflected light from the original, and an image sensor 12 such as a CCD (Charge Coupled Device) for converting the reflected light from the original to electrical form.

The imaging system 3 is composed of a light emitting portion 13 for emitting the light in such a method as to convert an electrical signal representing the image information input to the image sensor 12 into an optical signal, a photosensitive body 14 for forming a latent image by receiving the light from the light emitting portion 13, a developing unit 15 for developing the latent image created on the photosensitive body 14 with desired colors, a transfer unit 16 for transferring a developed image on the photosensitive body 14 to a recording sheet 2, a conveyer for conveying the recording sheet 2 transferred, a fixing unit 18 for fixing a developer onto the recording sheet 2 with the action of heat and pressure of a pair of upper and lower drums, a plurality of pairs of conveying rollers 19 for conveying the recording sheet 2, and a resist roller 20 for aligning a top end of the image on the photosensitive body 14 with a leading edge of the recording sheet 2.

The developing unit 15 comprises a black developing device 15K containing a black toner, a cyan developing device 15C containing a cyan (C) toner, a yellow developing device 15Y containing a yellow (Y) toner, and a magenta developing device 15M containing a magenta (M) toner, which are appropriately set at predetermined positions so that the image can be developed with each color. A heater is contained in either one of the drums on the fixing unit 18 to fix the image with the heat of the heater.

The sheet feed/conveyance unit 4 is composed of sheet feed cassettes 21a, 21b having recording sheets 2, recording sheet pressers 22a, 22b, and a plurality of pairs of conveying rollers 23.

The copy operation with the image processing apparatus thus constituted will be described below. Originals stacked on the original stacker 6a are sequentially fed one by one on to the original base glass 8 by the original conveying apparatus 6. And if an original is laid on the original base glass 8, a lamp 7 is lighted up, and the scanner unit 9 is moved in a direction of arrow A so that the original is illuminated. Thereafter, the reflected light passes via reflecting mirrors 10a to 10c through the condenser lens 11 to enter the image sensor 12. Then, the image information input to the image sensor 12 is subjected to a predetermined treatment by an image signal control unit as will be described later, and then input to the light emitting portion 13 to be converted to an optical signal. Then, the light emitted from the light emitting portion 13 is directed through a lens 24 via a reflecting mirror 25 on to the photosensitive body 14. And a latent image created on the photosensitive body 14 by this illuminating light is developed by the developing unit 15 having set predetermined developing devices.

On the other hand, a recording sheet 2 is supplied from the sheet feed cassettes 21a, 21b via conveying rollers 23 to the resist roller 20, and to the transfer unit 16 in a timed manner with the imaging on the photosensitive body 14, whereby the developer on the photosensitive body 14 is transferred onto the recording sheet 2. Then, the recording sheet 2 is conveyed on the conveyer 17 in a direction of arrow B to the fixing unit 18, where transferred developer is fixed on the recording sheet 2.

When in the monochrome copy, the recording sheet 2 is exhausted via a pair of sheet exhaust rollers 26 to the outside as indicated by the arrow C. On the other hand, when in the multicolor copy, the recording sheet 2 is bypassed via a separating mechanism 27 in a direction of arrow D on a lower conveying portion 28 and once stopped at a position of the resist roller 20. And the recording sheet 2 is developed by the developing device which has been exchanged for a predetermined color developing device, and again passed through the transfer unit 16 for the transfer and the fixing unit 18 for the fixing to obtain a predetermined multicolor copy. Then it is exhausted via the sheet exhaust rollers 26 to the outside as indicated by the arrow C.

Figure 2:
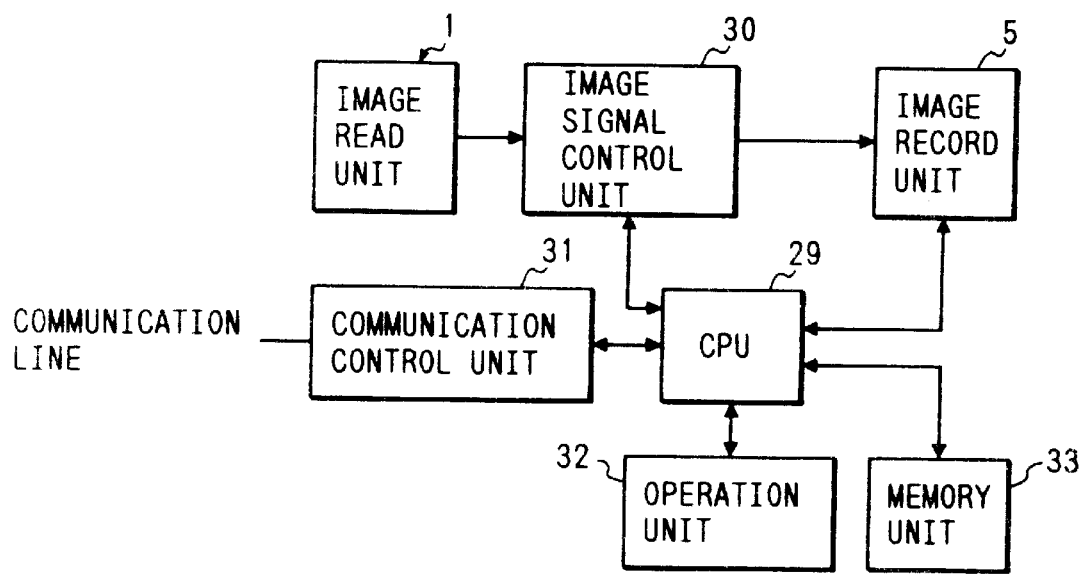
FIG. 2 is a block diagram illustrating a schematic configuration of the image processing apparatus.
Figure 3:
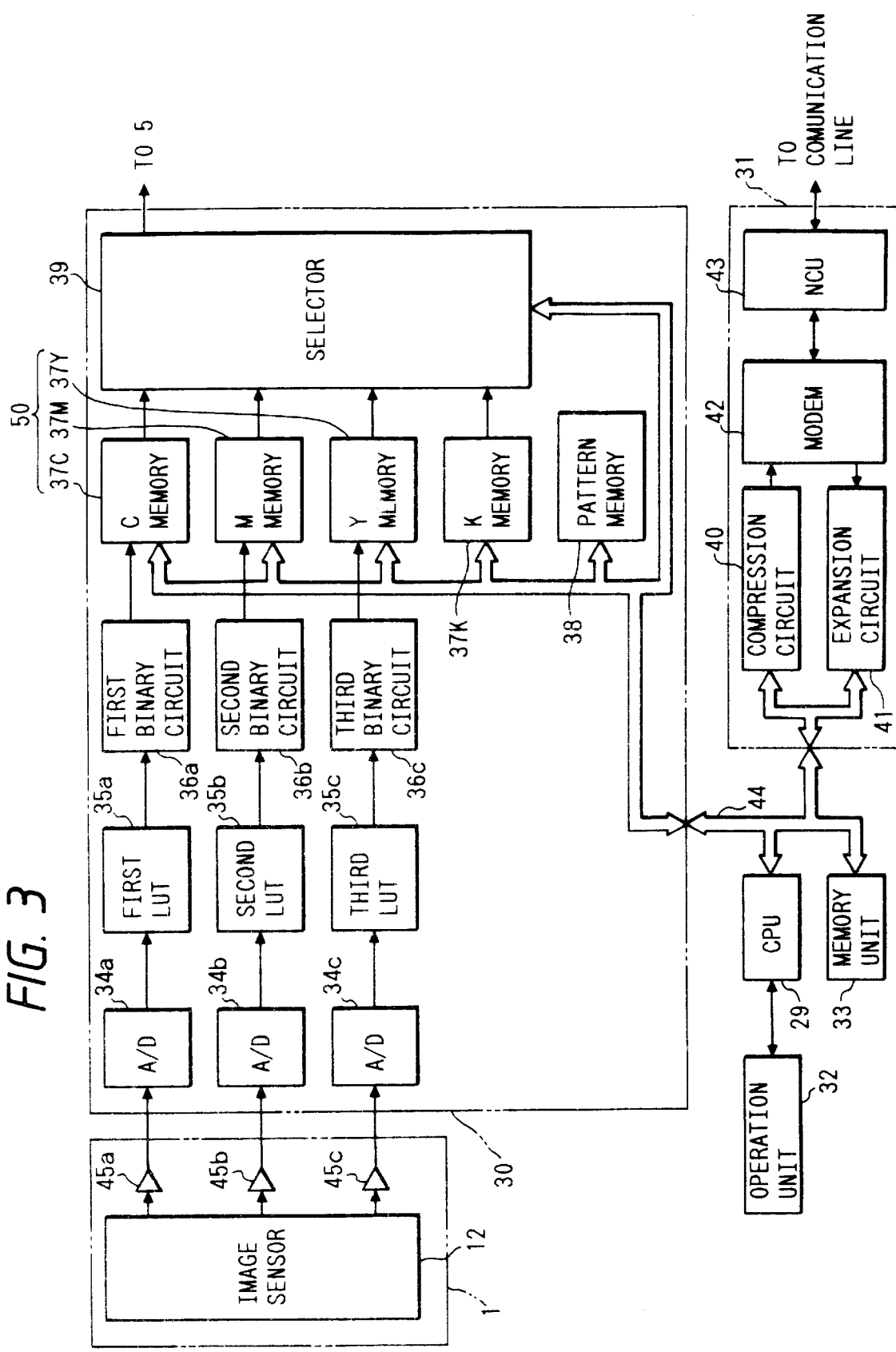
FIG. 3 is a block diagram illustrating the details of FIG. 2.

FIG. 2 is a block diagram illustrating the whole configuration of an image processing apparatus according to the second embodiment of the present invention.

When the copy operation is performed, the image information input to the image read unit 1 is subjected to a predetermined treatment with the image signal control unit 30 which is controlled by a CPU 29, and then output to the image record unit 5.

When the transmission of image is performed, the image information in the image signal control unit 30 is passed from the CPU 29 to the communication control unit 31 to be transmitted via the communication line to partner's terminal. On the other hand, the image information received from the partner's terminal is processed by the CPU 29 and passed to the image signal control unit 30 to be output to the copying unit 5.

32 is an operation unit having a ten key and a display panel, whereby the user can input a setting mode from a variety of modes. 33 is a memory unit having a read-only ROM area for storing predetermined control programs to be executed by the CPU 29, and a rewritable RAM area for storing various kinds of information from a communication control circuit 31 or the operation unit 32.

The image signal control unit 30 comprises first to third A/D converters 34a to 34c for converting the analog signal to the digital signal, first to third look-up tables (thereinafter referred to as Lookup table or simply as "LUT") 35a to 35c for converting input color information to the density information, first to third binary circuits 36a to 36c for converting multivalued density information to binary color information, color information memory unit 50 (C memory 37C, M memory 37M, Y memory 37Y) for storing the color information of cyan (C), magenta (M) and yellow (Y), respectively, K memory 37K for storing the black information, a pattern memory 38 for storing predetermined pattern information, and a selector 39 for selecting the image information input from the color information memory unit 50 or the K memory 37K so that any one of the image information is output.

The communication control unit 31 comprises a compression circuit 40 for compressing the image information to be transmitted, an expansion circuit 41 for expanding the image information received, a modem 42 for mutual conversion between the digital signal and the analog signal, and a network control unit 43 (thereinafter referred to as "NCU").

And the image signal control unit 30, the communication control unit 31, the CPU 29, and the memory unit 33 are interconnected via a control bus 44.

Next, the signal processing of the image processing apparatus in making a normal color copy will be described below.

First, the color image information of red (R), green (G) and blue (B) which have been photoelectrically converted by the image sensor 12 provided within the image read unit 1 are input to respective amplifiers (first to third amplifiers 45a to 45c). Subsequently, the color image information amplified to predetermined input levels by the first to third amplifiers 45a to 45c are input to the image signal control unit 30.

Thus, in the image signal control unit 30, the color image information are first converted from the analog signal to the digital signal by the first to third A/D converters 34a to 34c, and input to the first to third LUTs 35a to 35c.

In the first to third LUTs 35a to 35c, the color information of R, G and B are converted to logarithmic form to produce the multivalued density information of cyan (C), magenta (M) and yellow (Y).

Subsequently, the multivalued density information are input to the first to third binary circuits 36a to 36c, and converted to the binary (0, 1) density information to be stored in C memory 37C, M memory 37M and Y memory 37Y.

As shown in FIG. 1, the cyan developing device 15c is set at a predetermined position to read the image information (density information) stored in the C memory 37C. Then the selector 39 is set via the control bus 44 by the CPU 29 so that a signal line from the C memory 37C is selected, the content of the C memory 37C selected by the selector 39 being output to the image record unit 5.

Next, the image information output to the image record unit 5 is converted to the optical signal in an exposure control unit 13 to create a latent image on the photosensitive body 14. Then the latent image is developed by a cyan toner contained in the cyan developing device 12c, then transferred by the transfer unit 16, and fixed by the fixing unit 18, so that a cyan image is formed on the recording sheet 2.

Subsequently, the recording sheet 2 on which cyan image is formed is bypassed by the separating mechanism 27 through the lower conveying portion 28, and conveyed to a position of the resist roller 20. Thereafter, the magenta developing device 12M is set at a predetermined position, and the reading of image information from the M memory 37M is started. Then the selector 39 is set so that the image signal from the M memory 37M is selected. And the content of the M memory 37M selected is output to the image record unit 5.

The image information output to the image record unit 5 is developed on the photosensitive body 14 by a magenta toner contained in the magenta developing device 15M through the same process as above described, transferred and fixed on to the recording sheet 2 stopped at the position of the resist roller 20, whereby a magenta image is formed on the recording sheet 2 having the cyan image already formed.

Thereafter, the image information is read out from the Y memory 37Y, and a yellow image is formed as in the above-described manner, so that a desred color image can be formed.

Next, the transmission of the color image to partner's terminal will be described below.

As a specific example, the transmission of color original image as indicated by the bar graph in FIG. 4 will be described.

Figure 4:
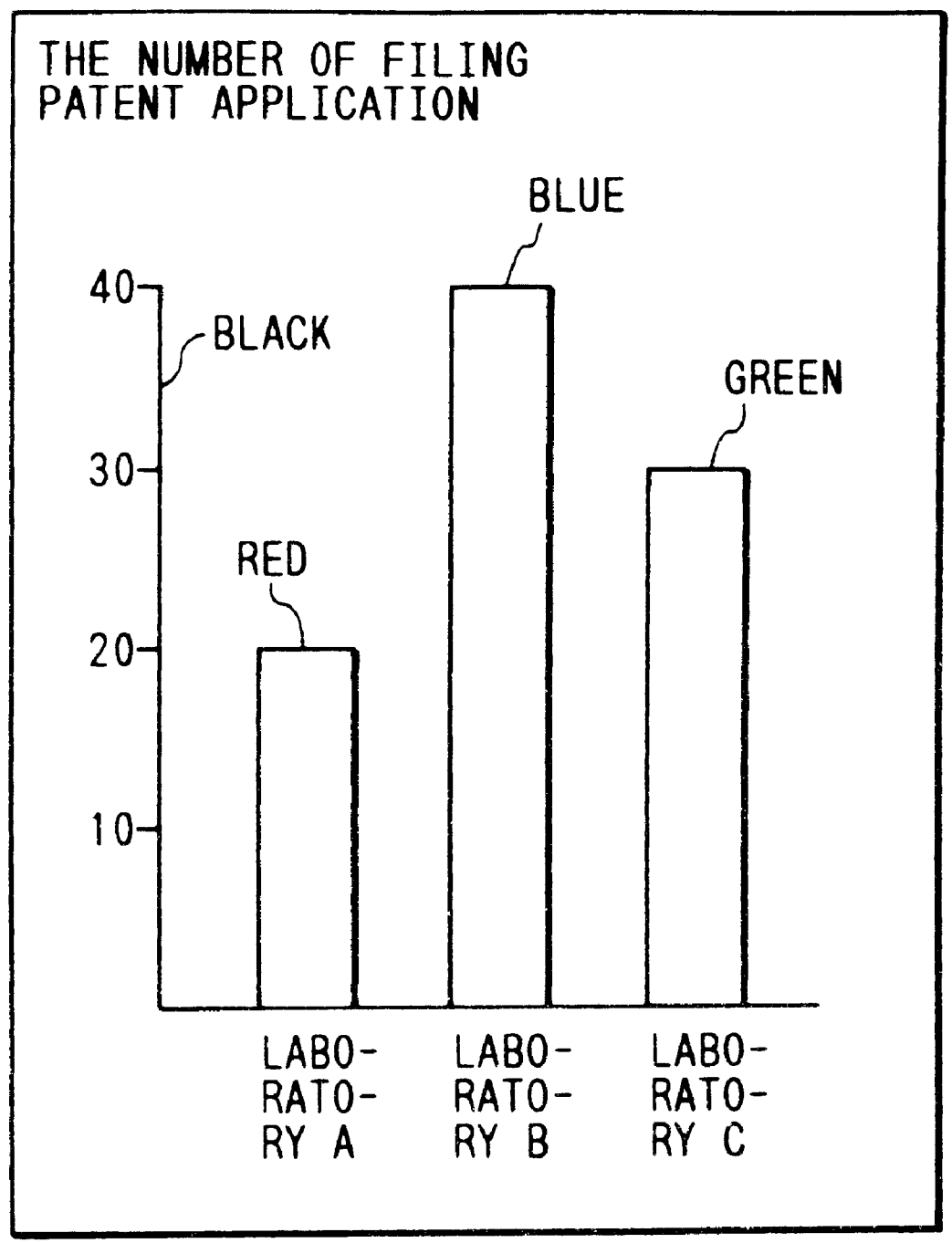
FIG. 4 is a view exemplifying a transmission original or an image recorded after reception.

FIG. 4 shows bar graphs indicating the number of filing patent applications in laboratories A to C, the number of applications being indicated by a red bar graph for laboratory A, a blue bar graph for laboratory B, and a green bar graph for laboratory C.

First, a color original laid on the original base glass 8 is read by the image sensor 12, and the image information is stored in the C memory 37C, M memory 37M and Y memory 37Y as in the previously-described manner.

Figure 5A:
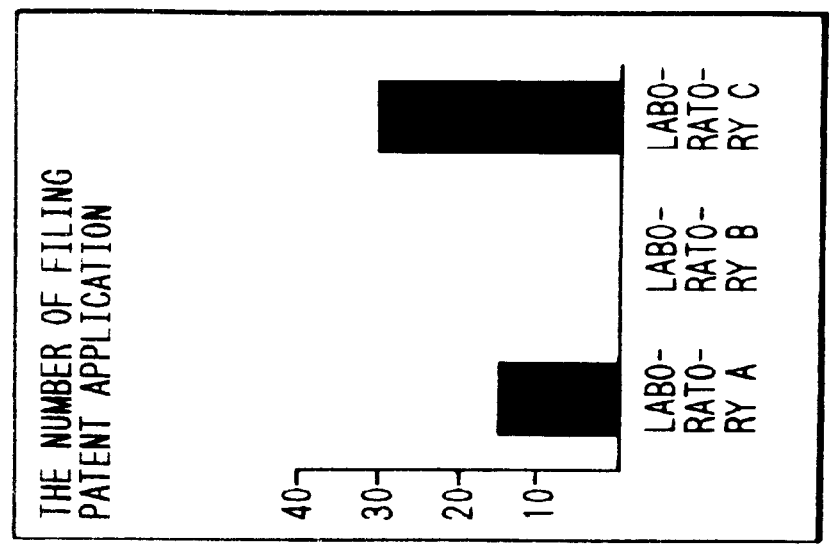
FIGS. 5A–5C are views exemplifying image data stored in a color information memory portion.
Figure 5B:
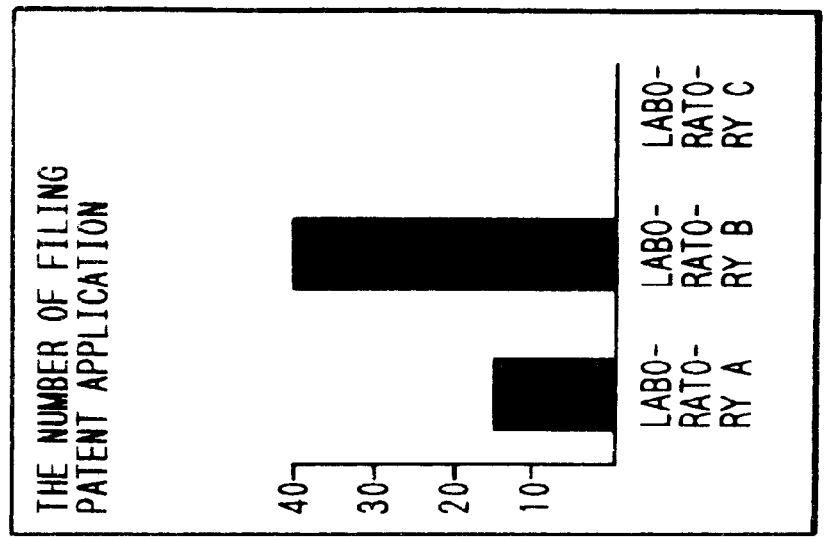
Figure 5C:
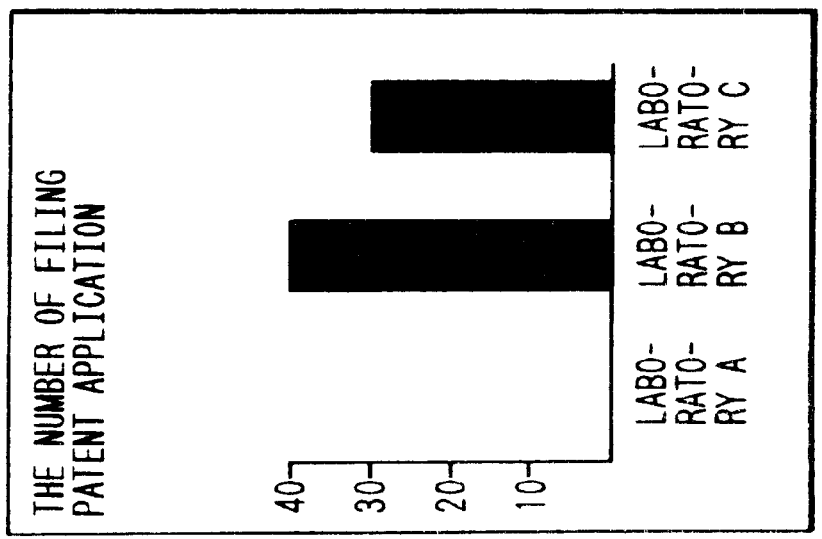

FIGS. 5A to 5C are graphs showing the memory contents stored in the C memory 37C, M memory 37M and Y memory 37Y, respectively. In the same figure, it is indicated that the portion (X-axis, Y-axis, character) in which the same information is stored is a black section in the original, and the other portion is a color section in the C memory 37C, M memory 37M and Y memory 37Y. That is, the red bar graph for laboratory A is stored in the M memory 37M and the Y memory 37Y. Also, the blue bar graph for laboratory B is stored in the C memory 37C and the M memory 37M. Further, the green bar graph for laboratory C is stored in the C memory 37C and the Y memory 37Y.

Then, the CPU 29 compares between the contents in the C memory 37C, M memory 37M and Y memory 37Y to determine the portion (black information) in which the same information is stored, and separate the black information from the color information excluding the black portion (thereinafter referred to as "color information"), with the content of the black information being entirely copied to the K memory 37K.

The CPU 29 discriminates the color information from the contents of each memory, reads the pattern information preset in a pattern memory 38 from the pattern memory 38, based on the color information, and writes the pattern information corresponding to the original color into the K memory 37K.

Figure 6:
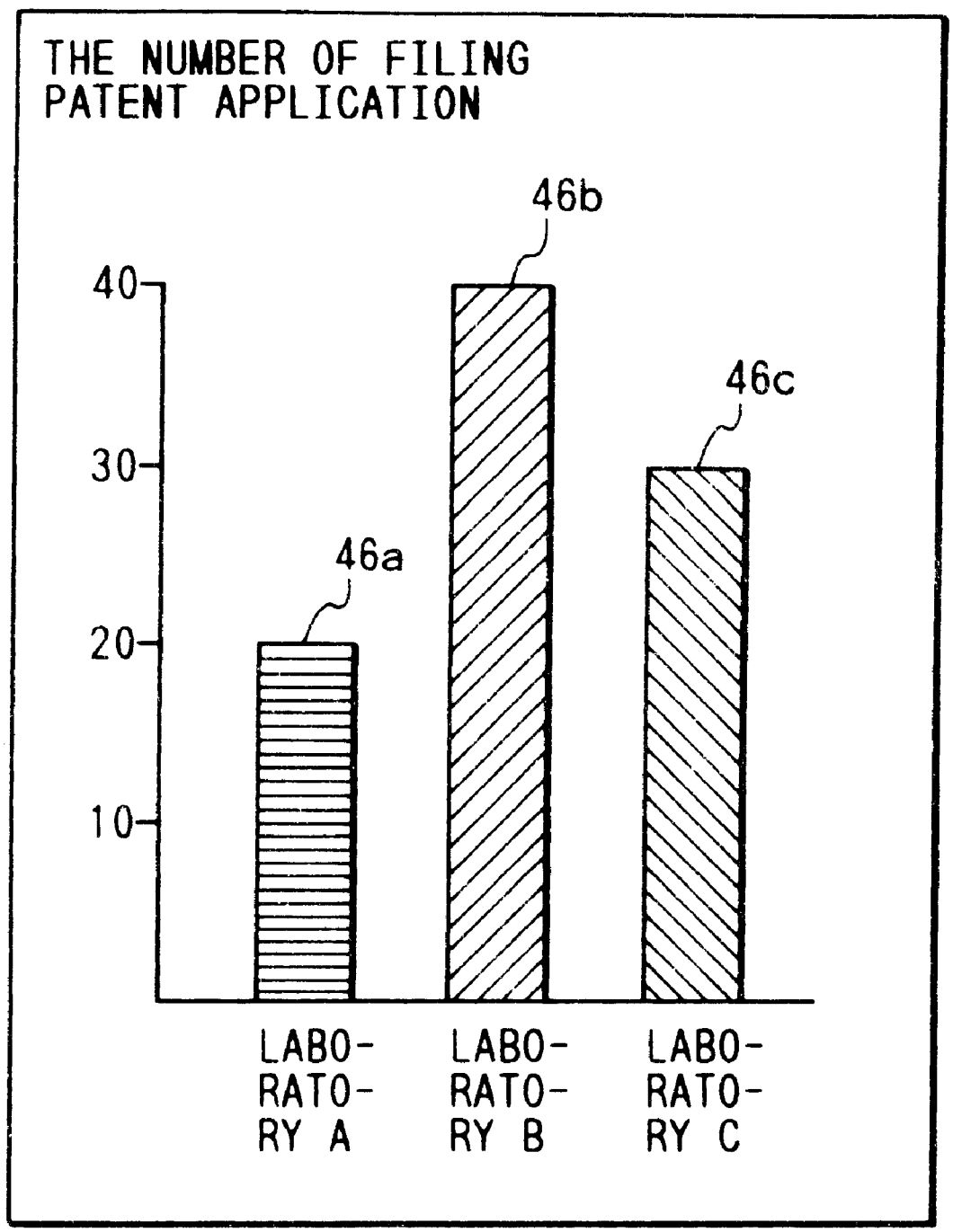
FIG. 6 is a view exemplifying data stored in a K memory portion.

FIG. 6 is a graph representation exemplifying the pattern written into the K memory 37K, in which a read bar graph for laboratory A as the first pattern 46a, a blue bar graph for laboratory B as the second pattern 46b, and a green bar graph for laboratory C as the third pattern 46c are written in the K memory 37K, respectively.

Figure 7:
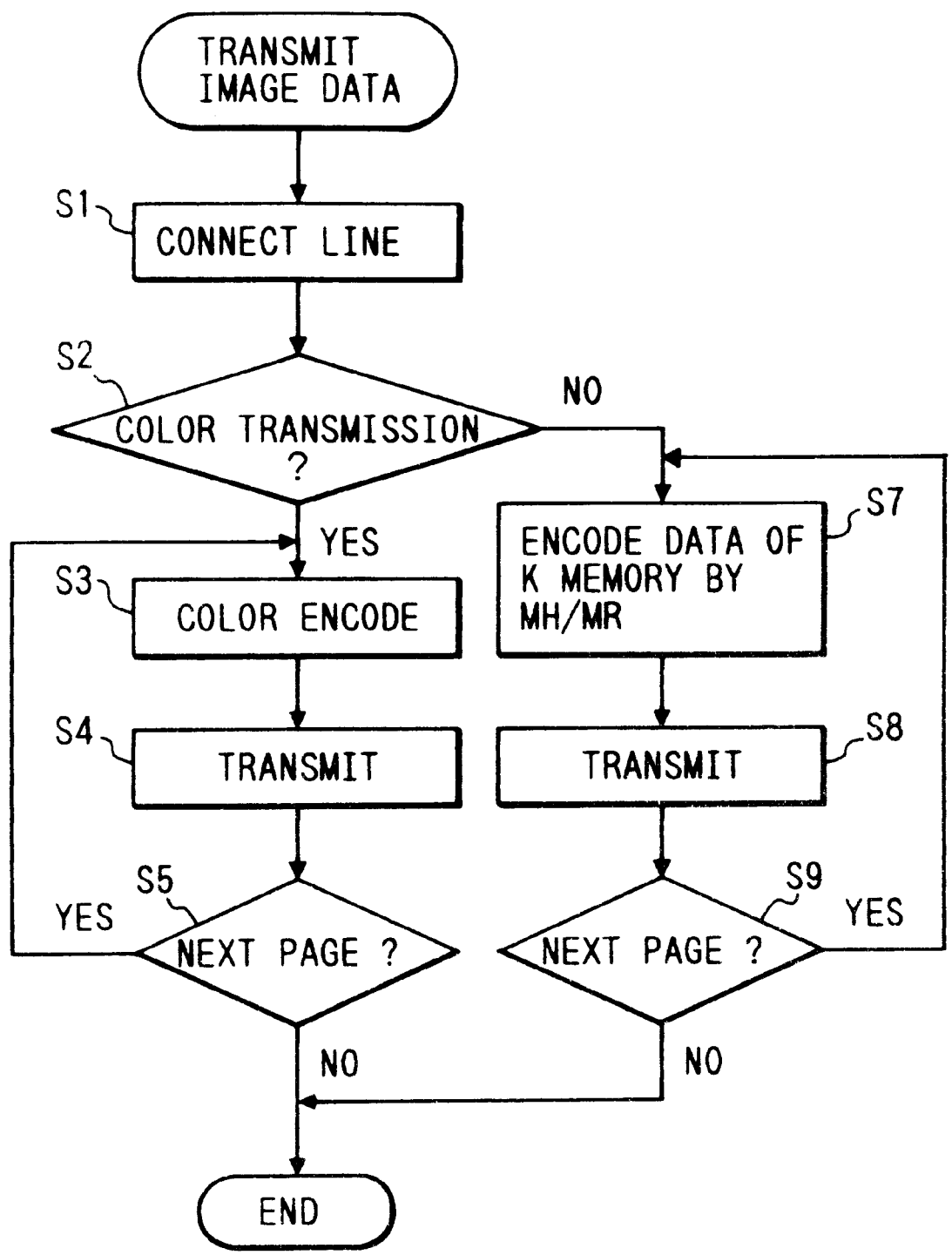
FIG. 7 is a flowchart showing a transmission procedure of image data.

Next, a transmission procedure for the transmission of image data will be described below with reference to a flowchart as shown in FIG. 7.

First, an accepting terminal is called to connect the line (step 1). And a determination is made whether or not the accepting terminal can accept the color image, based on a signal indicating the capability of the accepting terminal, for example, NSF signal (step S2). That is, the color or monochrome transmission is determined, and notified to the accepting side. In this case, if the monochrome transmission is determined, a signal indicating whether or not any patterned image is involved may be transmitted to the accepting side. When the accepting side can accept the color image data, C, M and Y data in the memory 50 are passed via the control bus 44 to the compression circuit 40 for making the color encoding such as ADCT encoding (step S3), and the color image is transmitted to the accepting side (step S4). Subsequently, at step S5, a determination is made whether or not there is any data (next page) for transmission of the color image. If the next page is present, the procedure returns to step S3, while if the next page is absent, the procedure is ended.

On the other hand, in the event where the accepting side is determined to have the capability of accepting only the monochrome data at step S2, CPU 29 reads the content of K memory 37K by raster scan, and transmits it via the control bus 44 to the communication control circuit 31. In the communication control unit 31, the information as much as the one line of main scan in the K memory 37K is encoded in either the MH method (modified Huffman method) or the MR method (modified READ method) to compress the information in the K memory 37K (step S7). Then the encoded information is phase modulated by the modem 42 and input to the NCU 43 for the control of transmission to the communication line. The compressed image information is output to the communication line by sequentially performing the above operation for each one page in the K memory 37K (step S8). Subsequently, at step S9, a determination is made whether or not there is any data (next page) for transmission of the monochrome image. If the next page is present, the procedure returns to step S7, while if the next page is absent, the procedure is eneded.

Thus, in accordance with the ability of partner's terminal, a color original can be transmitted in color if the partner is a color terminal, or by patterning the color portion even if it is a monochrome terminal. Accordingly, even if the partner's terminal does not have the capability of color reception, the color image can be received as a patterned monochrome original, so that the image can be transmitted without losing any content of the information.

Figure 8B:
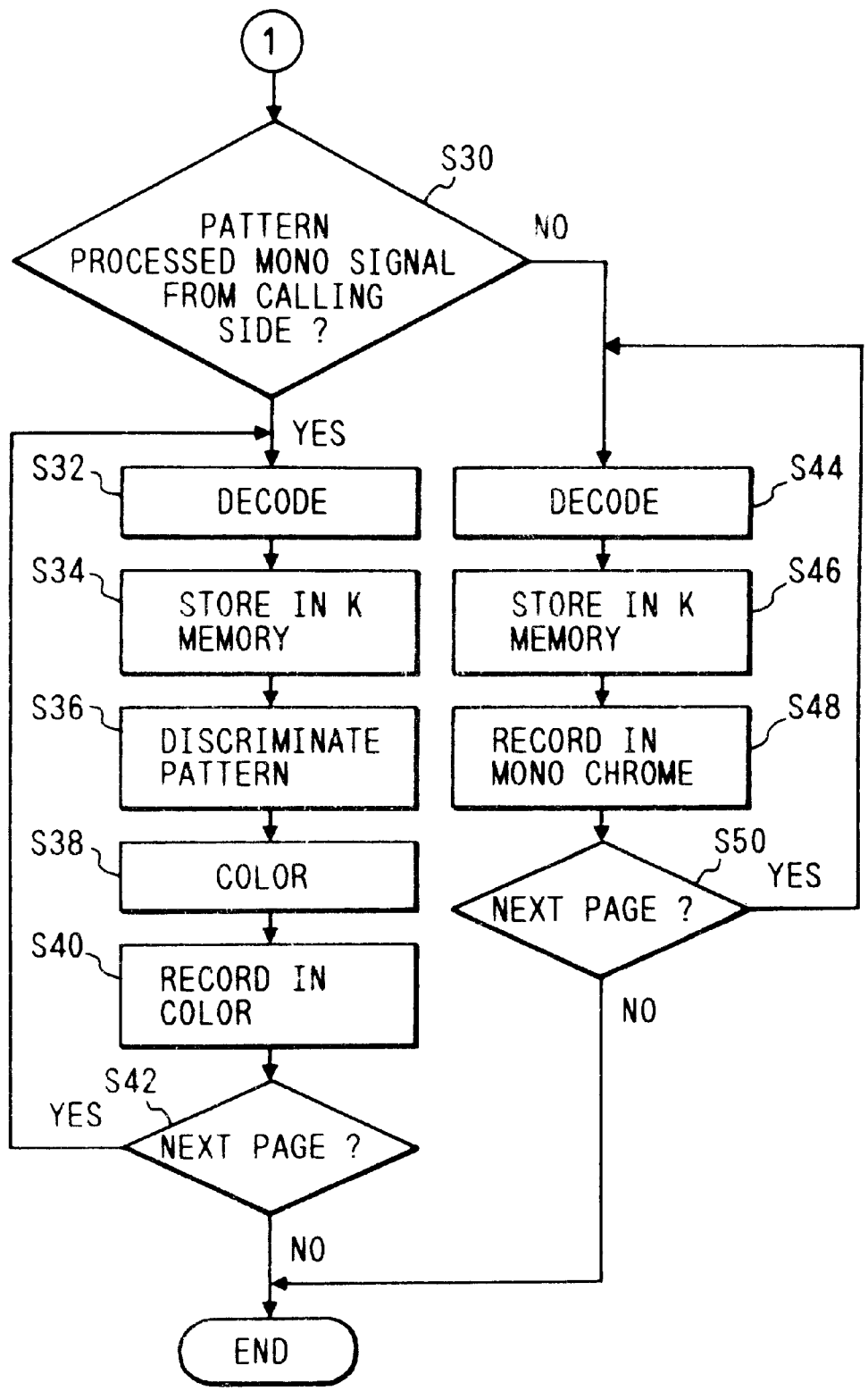
FIG. 8, subdivided in FIGS. 8A and 8B, is a flowchart showing a reception procedure of image data.

Next, the reception of color information transmitted from the partner's terminal will be described, based on a flowchart as shown in FIG. 8. First, if a call signal CI from the partner's terminal is received at step S21, a signal indicating the capability of color reception, monochrome reception, or monochrome pattern color processing is transmitted to the calling side, using NSF signal or the like (step S22). And a signal designating the transmission of color signal, patterned monochrome signal or simply monochrome signal by an NSS signal or the like from the calling side is discriminated at step S24 and S30. If the image information transmitted via the communication line is input to the NCU 43 of the communication control unit 31, the reception is controlled in accordance with the type of information.

That is, in the color information, the information from the NCU 43 is input to the modem 42 to be demodulated, and input to the expansion circuit 41. The expansion circuit 41 decodes the information in accordance with the MH method (modified Huffman method), the MR method (modified READ method) or the ADCT (step S25) to expand the image information. The image information output from the expansion circuit 41 is stored via the control bus 44 in the color information memory unit 50 (step S26). And the presence or absence of the next page is judged (step S28), in which if the next page is present, the procedure returns to step S25, while if it is absent, the procedure is ended.

On the other hand, in the monochrome information containing the pattern, the next data is transmitted to the K memory 37K and stored therein (step S34). Thus, the image information having the pattern information as shown in FIG. 6 which is transmitted from partner's terminal is stored in the K memory 37K.

Subsequently, the CPU 29 investigates a patterned portion from the stored content of the K memory 37K (step S36), and if it coincides with the pattern information preset in the pattern memory 38, "1" is written at a location in the color information memory unit 50 for a predetermined color corresponding to the patterned portion (step S38). For example, red for the first pattern 46a, blue for the second pattern 46b, and green for the third pattern 46c are preset in the pattern memory 38, whereby "1" is written at locations in the C memory 37C, M memory 37M and Y memory 37Y for the preset color corresponding to the patterned portion. And the color recording is made based on the information stored in the color information memory unit 50 (step S40). Then, at step S42, the presence or absence of the next page is judged, and if the next page is absent, the procedure is ended.

When simple monochrome signal is transmitted, the monochrome information is first decoded (step S44), the data is stored in the K memory 37K (step S46), and the monochrome information is recorded by outputting it to the image record unit 5 (step S48). Then if the next page is absent at step S50, the procedure is ended.

FIGS. 9A to 9D show the image information stored in each memory 37C, 37M, 37Y, and 37K.

That is, the image information not stored in the pattern memory 38 as the pattern information is stored in the K memory 37K (FIG. 9A), and the portions corresponding to second and third patterns 46b, 46c are stored as the image information in the C memory 37C (FIG. 9B). The portions corresponding to first and second patterns 46a, 46c are stored as the image information in the M memory 37M (FIG. 9C), and the portions corresponding to first and third patterns 46a, 46c are stored as the image information in the Y memory 37Y (FIG. 9D). Thereafter, the image is formed on the recording sheet 2 through the same process as previously described.

That is, the cyan developing device 15c is set at a predetermined position, and the image is read from the C memory 37C. Subsequently, the content of the C memory 37C is selected by the selector 39 and output to the image record unit 5.

The image information output to the image record unit 5 is converted into the optical signal by the light emitting portion 10 to produce a latent image on the photosensitive body 14. The latent image on the photosensitive body 14 is developed by the cyan toner contained in the cyan developing device 15c. Then, the recording sheet 2 on which a cyan image is formed is bypassed through the lower conveying portion 28 to a position of the resist roller 20, and subsequently, as previously described, the images of magenta (M) and yellow (Y) are formed using the magenta developing device 15M and the yellow developing device 15Y, so that a desired color copy can be obtained.

The simple monochrome data is expanded (step S44), stored in the K memory 37K (step S46), and then recorded in monochrome (step S48).

As described, in the image communication apparatus, it is possible to obtain a color image wherein when a monochrome original having patterned portion is transmitted, the patterned portion can be colored, even if the partner's terminal is not provided with the color transmission feature.

Next, an image processing apparatus capable of dichromatic recording will be described as another embodiment.

Figure 10:
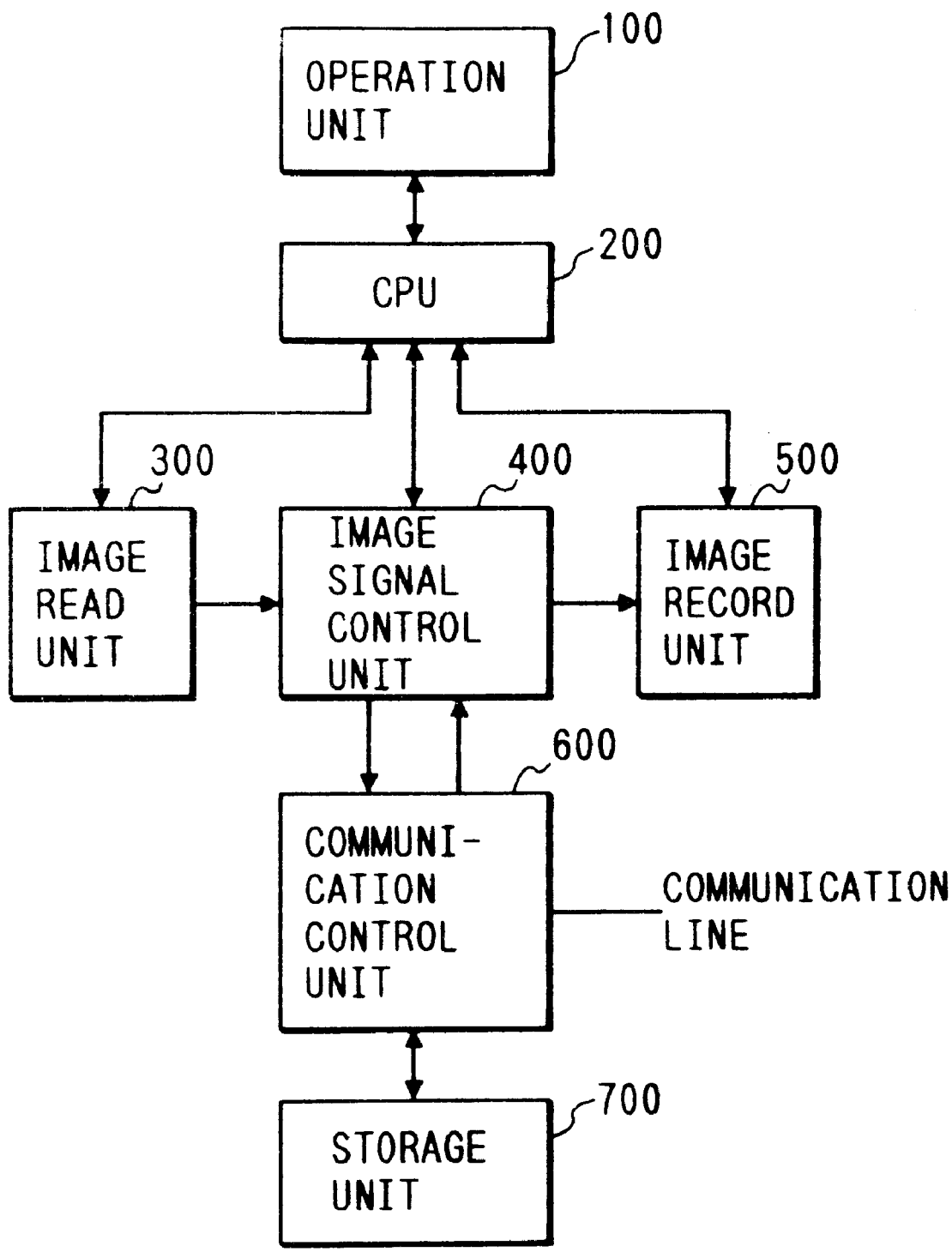
FIG. 10 is a block diagram illustrating a schematic configuration of an image processing apparatus according to the second embodiment of the present invention.

In FIG. 10, an operation unit 100 is used for the setting of various operations in the image processing apparatus or the input of the image processing content. An image read unit 300 is configured to read an original image, in which this read data and image data received by a facsimile apparatus are processed by an image signal control unit 400. The image signal control unit 400 receives an image processing command along with the image data from a partner's terminal, whereby the received image data is processed in accordance with the image processing command.

An image record unit 500 serves to record an original image read by the image read unit 300 or an image received by the facsimile apparatus onto a recording sheet, whereby the image processed by the image signal control unit 400 is recorded on the recording sheet. The operation unit 100, the image read unit 300, the image signal control unit 400 and the image record unit 500 are controlled by a CPU (Central Processing Unit) 200, which comprises a ROM (Read Only Memory) storing some programs, and a memory 210 such as a RAM (Random Access Memory) for the work.

In making the facsimile transmission for the original image read by the image read unit 300 after the image processing, if a transmission destination of the original and an image processing mode applied to the original are designated by the operation unit 100 as shown in FIG. 1, the CPU 200 issues a command code corresponding to the designated contents and stores it in the RAM. Then the image processing command is only transmitted to the partner's terminal without performing the image processing. The CPU 200 on the accepting side controls, in accordance with this image processing command, the image signal control unit 400 to process the received image data from the partner's terminal. A communication control unit 600 transmits the image processed by the image signal control unit 400 via the communication line to the partner's terminal, or receives the image from the partner's terminal via the communication line, whereby the image data processed by this communication control unit 600 is stored in the storage unit 700.

Figure 11:
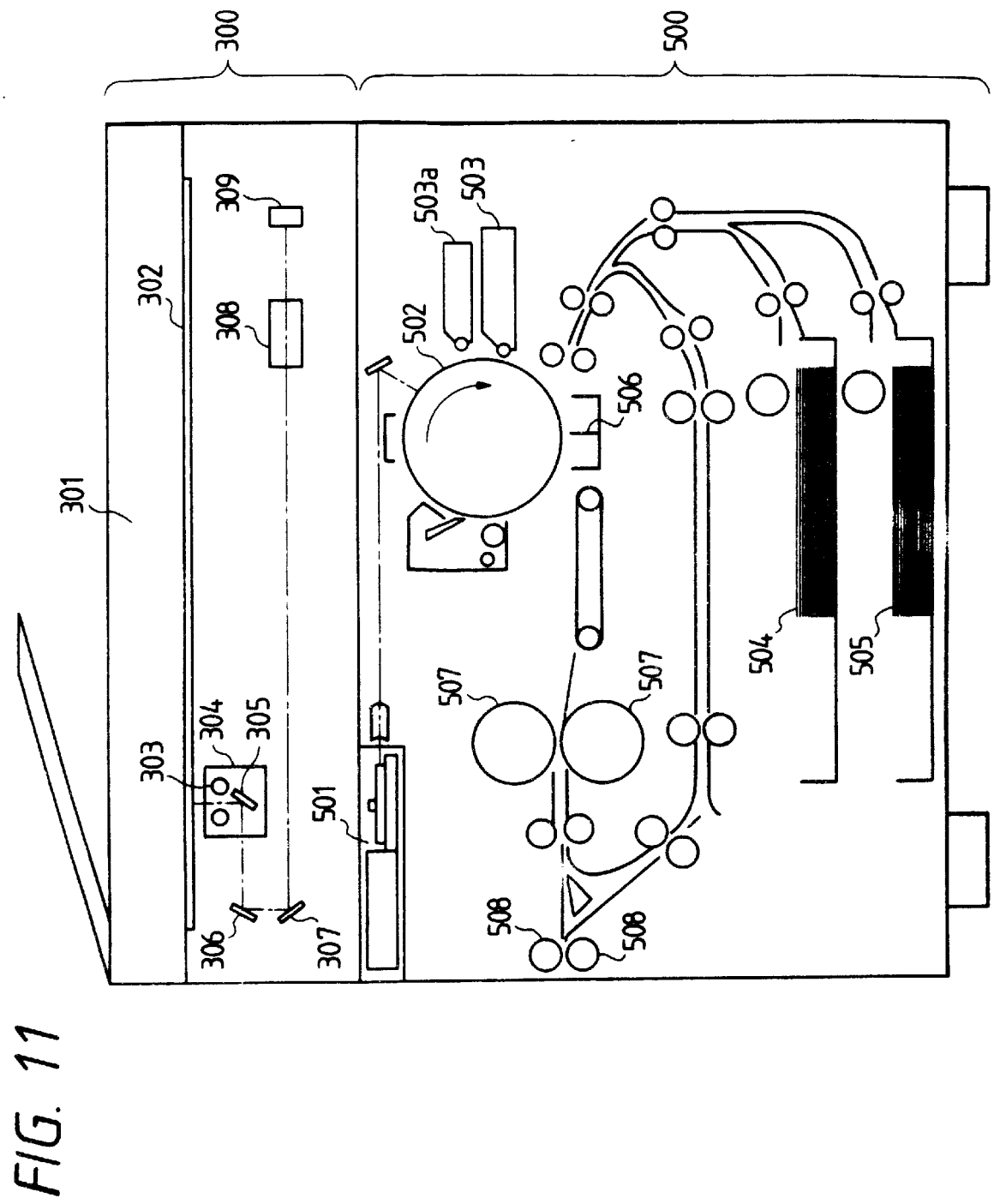
FIG. 11 is an internal structural view of an image read unit and an image record unit in FIG. 10.

FIG. 11 shows the detailed configuration of the image read unit 300 and the image record unit 500. In the first step, one of the originals stacked on an original feeder 301 is fed on to the original base glass 302, a lamp 303 on the scanner unit 304 is lighted up to illuminate an original, and the scanner unit 304 is moved in a sub-scan direction. The reflected light from the original is reflected at the mirrors 305, 306, 307 in succession, and then passes through the lens 308 to be input to the image sensor 309. The image sensor 309 outputs an electric image signal by the photoelectric conversion. In this way, image data is output from the image read unit 300 as shown in FIG. 10 to the image signal control unit 400 as shown in FIGS. 10 and 12.

The image data processed by the image signal control unit 400 is scanned by a laser write unit 501, whereby an electrostatic latent image is formed on a photosensitive body 502, and developed with a toner by developing devices 503, 503a, with a toner image transferred onto a sheet by a transfer unit 506. The sheet is conveyed from sheet feed cassettes 504, 505 to the position of the transfer unit 506, whereby the toner image is transferred and then fixed by a fixing unit 507, and exhausted by an exhaust roller 508. That is, the image record unit 500 can form an image in dichrome by means of the developing devices 503, 503a.

Figure 12:
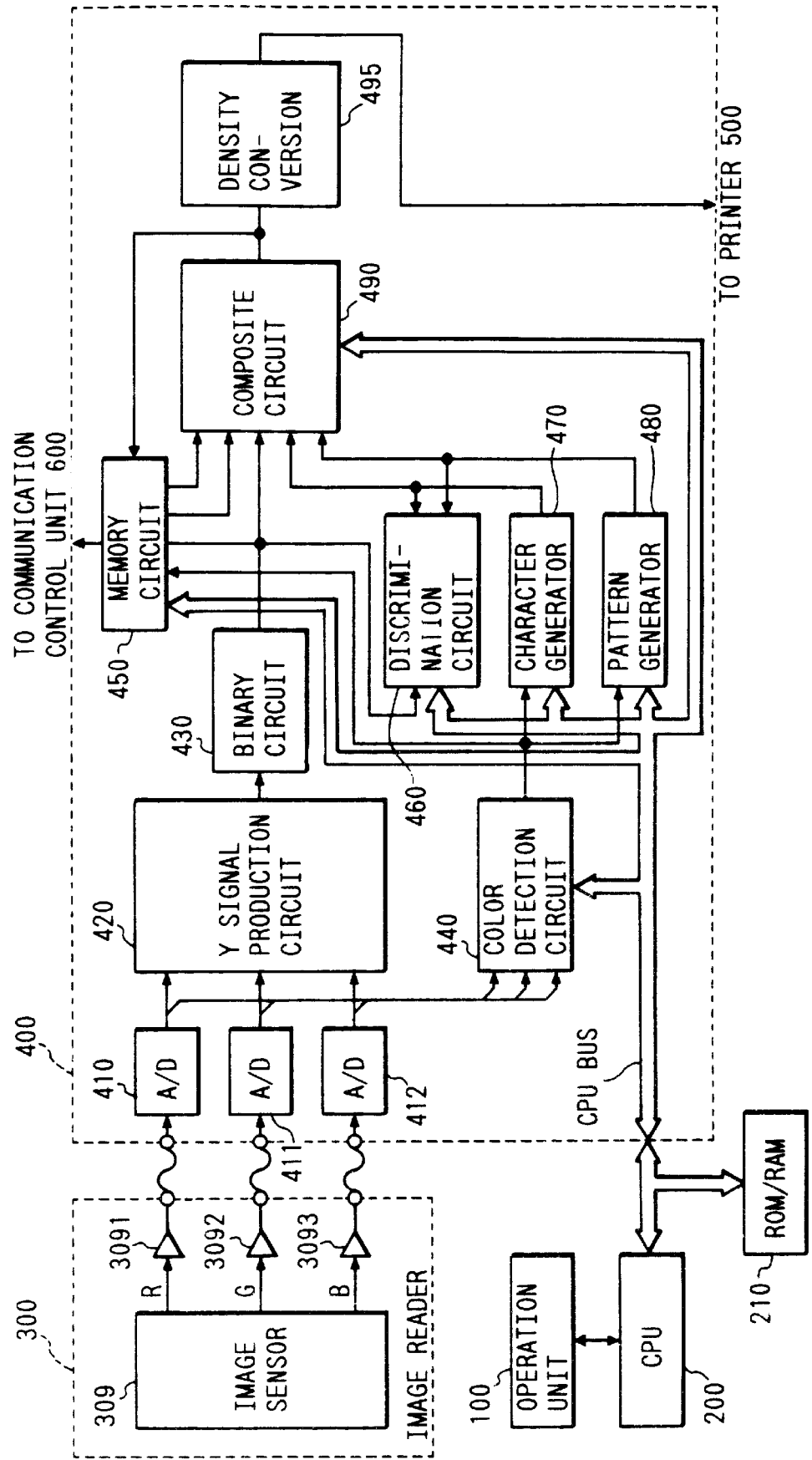
FIG. 12 is a block diagram illustrating a detailed configuration of an image signal control unit in FIG. 10.

Referring now to FIG. 12, the image signal control unit 400 will be described in detail. First, an original image is read by the image sensor 309 in the image read unit 300, and converted into color signals of R, G and B, which are respectively amplified by amplifiers 3091 to 3093 so as to conform to the input level for respective A/D converters 410 to 412 within the image signal control unit 400. Then, a Y (luminance) signal production circuit 420 produces a luminance signal Y, using R, G, B digital signals of e.g., each 8 bits, converted by the A/D converters 410 to 412 and the following expression.

$$Y=0.30R+0.59G+0.11B$$

Subsequently, a binary circuit 430 converts the multivalued luminance signal Y into a binary luminance information to be output to a composite circuit 490, which then outputs directly this binary luminance information to a density conversion portion 495, when it is set in the normal mode by CPU 200. The density conversion portion 495 reverses the luminance information to obtain the density information, which is output to the image record unit 500 in the copy mode, or output to the communication control unit 600 via a memory circuit 450 in the facsimile transmission mode.

R, G, B digital signals converted by the A/D converters 410 to 412 are also input to a color detection circuit 440, in which the color of input image is detected by the color detection circuit 440 in the color recognition in the facsimile transmission mode. Note that the color detection circuit 440 detects the color region of input image by comparing each R, G, B digital signal with a color recognition table containing the preset level ratios between their signals, extracts the characteristic parameters such as color, coordinates and contour of the color region out of the normal image consisting of black characters, for example, in which the characteristic parameters are stored in the memory circuit 450 as the color region information. The storing method for the memory circuit 450 is one having less amount of information among those of storing the pixels directly, or storing only the contour line of the color region. The color region information thus obtained is supplied to the communication control unit 600 and transmitted via the communication line to the external apparatus, along with the luminance information, i.e., the normal image information, as previously described.

On the other hand, in the facsimile reception, first, a signal indicating "presence of color signal" or "absence of color signal" is input to the CPU 200 in a phase B of the facsimile sequence. In the case of "presence of color signal", the image information and the color region information are stored by the communication control unit 600 in the memory circuit 450.

When the monochromatic mode is set by the CPU 200, a pattern generator 480 generates an image pattern corresponding to the color information region as described, using the color region information, whereby the image pattern is composed with the normal image information from the memory circuit 450 in a composite circuit 490, and output to the density conversion unit 495. This composite data is reversed by the density conversion unit 495, and output to the image record unit 500, so that the monochromatic image is printed.

On the other hand, when the dichromatic mode is set by the CPU 200, the image information from the communication control unit 600 and the color image reproduced (restored) with the color region information (characteristic parameters) are stored each other in different areas of the memory circuit 450. The normal image information from the memory circuit 450 and the color image directly passes through the composite circuit 490, or are not composed, so as to be output to the density conversion unit 495 which then outputs the two image data to the image record unit 500. In the image record unit 500, the developing devices 503, 503a form a dichromatic image from the normal image information and the color image. Note that a character generator 470 generates characters, which are then overlaid on an image and output to the composite circuit 490, while a discrimination circuit 460 discriminates the image for the pattern matching and the like.

Referring now to FIG. 13, the detailed configuration of the communication control unit 600 will be described below. In the facsimile transmission, the image information processed by the image signal control unit 400 is stored in image memory 601, then compressed and encoded by compression/expansion circuit 602, whereby a compressed code is stored in encode memory 603. The CPU 604 within the communication control unit 600 reads the encoded image information stored in the encode memory 603 and outputs it via CPU bus to a hard disk interface 605. The hard disk interface 605 stores this encoded image information into the storage unit 700.

The CPU 604 also sends out pulses corresponding to the telephone number of transmission destination which is set by means of the operation unit 100, via NCU (Network Control Unit) to the telephone line. And once the line is connected, the CPU 604 transmits a signal of "presence of image processing" and an image processing command stored in a RAM of the CPU 200 as shown in FIG. 10 via the modem 606 and the NCU 607 to the transmission destination, in the phase B of facsimile sequence, and then reads the encoded image information of the storage unit 700 via the hard disk interface 605, which is then output to the modem 606. Accordingly, this encoded image information is modulated by the modem 606, and transmitted via the NCU 607 to the transmission destination.

On the other hand, in the facsimile reception, the signal of "presence of image processing" and the image processing command are first interpreted by the CPU 200 as shown in FIG. 10 in the phase B of facsimile sequence. Subsequently, the image data (compressed code) from the partner's terminal is received via the NCU 607, demodulated by the modem 606, and then stored via the hard disk interface 605 in the storage unit 700. Then, the compressed code is stored in the encode memory 603, then expanded by the compression/expansion circuit 602, and output to the image signal control unit 400 after the original image data is stored in the image memory 601.

Thereby the transmission side transmits the image data and an image processing command without performing the image processing, while the reception side performs the image processing with the image processing command, so that the transmission time for the image data can be shortened. Also, the transmission side extracts and transmits the characteristic parameters such as color, coordinates and contour line of the color region in the transmission original, and the reception side performs the color processing for the received image data with those characteristic parameters, so that the color original image can be transmitted at a lower transmission cost.

While the transmit image data is once stored in the storage unit 700 before transmission, and the received image data is once stored in the storage unit 700, it should be noted that the transmit or receive data may be directly output from the encode memory 603 via the modem 606, or input via the modem 606 to the encode memory 603 by omitting the storage unit 700. Also, instead of visualizing the receive image with the image record unit 500, only the display may be used. Further, instead of transmitting the image read by the image read unit 200, a disk driver of image file or an image memory of VTR (Video Tape Recorder) may be used.

The present invention is applicable to dot impact recording apparatus such as an ink jet recording apparatus, a thermal transfer recording apparatus, and a thermal recording apparatus, as well as electrophotographic recording apparatuses.

What is claimed is:

1. A color image recording apparatus comprising:
   communication means for receiving color image information and an image processing command;
   control means for controlling said recording apparatus to process the color image information in accordance with the image processing command to provide processed color image information;
   converting means for converting the processed color image information into monochrome pattern information corresponding to at least one color of the color image information; and
   recording means for selectively recording each of a color image and a monochrome pattern image,
   wherein said recording means records a color image in accordance with the processed color image information in case of a color recording mode, and records a monochrome pattern image in accordance with the monochrome pattern information from said converting means in case of a monochrome recording mode.

2. The color recording apparatus according to claim 1, wherein said recording means is any one of an electrophotographic printer, an ink jet printer, a thermal transfer printer, a thermal printer, and a dot impact printer.

3. The color image recording apparatus according to claim 1, wherein said color image information includes image information and color region information.

4. The color image recording apparatus according to claim 1, wherein said communication means receives a signal indicative of presence or absence of a color signal.

5. The color image recording apparatus according to claim 1, wherein said apparatus is a facsimile apparatus.

6. A color image recording method comprising the steps of:
   receiving color image information and an image processing command;
   controlling said recording method to process the color image information in accordance with the image processing command to provide processed color image information;
   converting the processed color image information into monochrome pattern information corresponding to at least one color of the color image information; and
   selectively recording each of a color image in accordance with the processed color image information in case of a color recording mode, and recording a monochrome pattern image in accordance with the monochrome pattern information from said converting step in case of a monochrome recording mode.

7. The color recording method according to claim 6, wherein, in said recording step, any one of an electrophotographic printer, an ink jet printer, a thermal transfer printer, a thermal printer, and a dot impact printer is used.

8. The color image recording method according to claim 6, wherein said color image information includes image information and color region information.

9. The color image recording method according to claim 6, wherein in said receiving step, a signal indicative of presence or absence of a color signal is received.

10. A facsimile apparatus comprising:
    receiving means for inputting color image information from a transmitting side;
    converting means for converting the color image information into monochrome pattern information corresponding to at least one color of the color image information; and
    recording means for recording a color image in accordance with the color image information from said receiving means in case of a color recording mode, and recording a monochrome pattern image in accordance with the monochrome pattern information from said converting means in case of a monochrome recording mode.

11. A recording method of a facsimile apparatus, said method comprising the steps of:
    receiving color image information from a transmitting side;
    converting the color image information into monochrome pattern information corresponding to at least one color of the color image information; and
    recording a color image in accordance with the color image information in said receiving step in case of a color recording mode, and recording a monochrome pattern image in accordance with the monochrome pattern information from said converting means in case of a monochrome recording mode.

* * * * *

UNITED STATES PATENT AND TRADEMARK OFFICE
CERTIFICATE OF CORRECTION

PATENT NO. : 6,075,927
DATED : June 13, 2000
INVENTOR(S) : Masanori Sakai et al.

It is certified that error appears in the above-identified patent and that said Letters Patent is hereby corrected as shown below:

Item [56], REFERENCES CITED
Foreign Patent Documents
"3191482" should read -- 3-191482 --.

OTHER PUBLICATIONS
"Weideman," should read -- Weidman, --.

Column 4,
Line 21, "(thereinafter" should read -- (hereinafter --.
Line 40, "(thereinafter" should read -- (hereinafter --.
Line 55, "are" should read -- is --.

Column 5,
Line 35, "desred" should read -- desired --.

Column 6,
Line 1, "separate" should read -- separates --.
Line 3, "(thereinafter" should read -- (hereinafter --.
Line 58, "eneded" should read -- ended --.

Column 9,
Line 34, "bits," should be deleted.

UNITED STATES PATENT AND TRADEMARK OFFICE
CERTIFICATE OF CORRECTION

PATENT NO. : 6,075,927
DATED : June 13, 2000
INVENTOR(S) : Masanori Sakai et al.

It is certified that error appears in the above-identified patent and that said Letters Patent is hereby corrected as shown below:

Column 10,
Line 25, "other" should be deleted.

Signed and Sealed this

Ninth Day of October, 2001

Attest:

NICHOLAS P. GODICI
Attesting Officer    Acting Director of the United States Patent and Trademark Office